United States Patent [19]

Sato

[11] Patent Number: 4,545,654
[45] Date of Patent: Oct. 8, 1985

[54] BRIGHT TELEPHOTO LENS

[75] Inventor: Shigetada Sato, Tokyo, Japan

[73] Assignee: Asahi Kogaku Kogyo Kabushiki Kaisha, Tokyo, Japan

[21] Appl. No.: 662,798

[22] Filed: Oct. 19, 1984

Related U.S. Application Data

[63] Continuation of Ser. No. 425,582, Sep. 28, 1982, abandoned.

[30] Foreign Application Priority Data

Nov. 11, 1981 [JP] Japan .............................. 56-180883

[51] Int. Cl.$^4$ ............................................. G02B 13/02
[52] U.S. Cl. .................................................. 350/454
[58] Field of Search ......................... 350/454, 463, 464

[56] References Cited

U.S. PATENT DOCUMENTS 4,113,357  9/1978  Nakamura ............................. 350/454
4,293,197  10/1981  Kobayashi et al. .................. 350/454

Primary Examiner—John K. Corbin
Assistant Examiner—Paul Dzierzynski
Attorney, Agent, or Firm—Sughrue, Mion, Zinn, Macpeak, and Seas

[57] ABSTRACT

A bright telephoto lens having a small telephoto ratio and with a properly compensated secondary spectrum which would otherwise largely affect the image-forming ability of the lens. The telephoto lens has a convergent lens group on the opposite side and a divergent lens group on the image side. The convergent group includes first, second and third positive lenses and a single negative lens, the first positive lens being closest to the object and made of an optical material having a partial dispersion ratio in the range of from 1.22 to 1.29 with respect to g-line and d-line. The negative lens is disposed more closely to the image than the first positive lens. The second and third positive lenses are disposed more closely toward the image than the first positive lens and are made of an optical material of anomalous dispersion having a partial dispersion ratio in the range of from 1.22 to 1.24 with respect to g-line and d-line, and have an Abbe number $\nu_d$ which ranges from 80 to 95.5. The telephoto lens satisfies the following relations:

$$0.20 < \frac{\psi_1}{\psi_2 + \psi_3} < 0.55 \quad (1)$$

$$23.5 < \nu_{dn} < 55.0 \quad (2)$$

$$0.4 < \frac{|\psi_n|}{\psi_p} < 0.9 \quad (3)$$

where $\psi_1$, $\psi_2$, $\psi_3$ are the refractive powers of the first, second and third positive lenses, respectively, $\nu_{dn}$ is the Abbe number of the negative lens, $\psi_p$ is the sum of the surface refractive powers of the three positive lenses on their image sides, and $\psi_n$ is the surface refractive power of the negative lens on the image side, with $\psi_n < 0$.

8 Claims, 12 Drawing Figures

BRIGHT TELEPHOTO LENS

This is a continuation of application Ser. No. 425,582 filed 09/28/82 now abandoned.

BACKGROUND OF THE INVENTION

The present invention relates to a bright telephoto lens having a small telephoto ratio with a secondary spectrum properly compensated for which would largely affect the image forming ability of the telephoto lens.

It is known in the art of telephoto lenses that even if chromatic aberrations are compensated for with respect to light rays of two particular wavelengths, chromatic aberrations remain for light rays of other wavelengths, that is, the amount of the secondary spectrum influences the image forming ability to a large degree. Such secondary spectrum can be reduced in telephoto lenses having a convergent lens group and a divergent lens group arranged in order from the object by using a special optical material of anomalous dispersion such as an optical crystal such as fluorite, or glass of anomalous dispersion for positive lenses in the convergent lens group. The optical material of anomalous dispersion used is located most closely to the object since the more apart the light ray is spaced from the optical axis, the more effective against the chromatic aberration.

The optical material of anomalous dispersion, however, is soft, has a surface refractive index that varies widely with temperature, and is of a high coefficient of thermal expansion, so that the material is liable to be injured when placed most closely to the object in direct contact with ambient air, and to get damaged or have its image forming ability reduced due to temperature changes.

SUMMARY OF THE INVENTION

It is, therefore, an object of the present invention to provide a bright telephoto lens having a small telephoto ratio which will eliminate the above difficulty by using a first lens made of an optical material having a relatively small partial dispersion ratio, a refractive index less variable with temperature, being less subjected to being injured, and having a smaller coefficient of thermal expansion as compared with a special optical material of anomalous dispersion, the telephoto lens including a convergent lens group having lenses distributed and shaped so as to reduce a secondary spectrum to a large degree and correct or compensate for various aberrations such as spherical aberration, coma and the like properly.

DESCRIPTION OF THE PREFERRED EMBODIMENTS

The present invention will now be described in detail.

Figure 1:
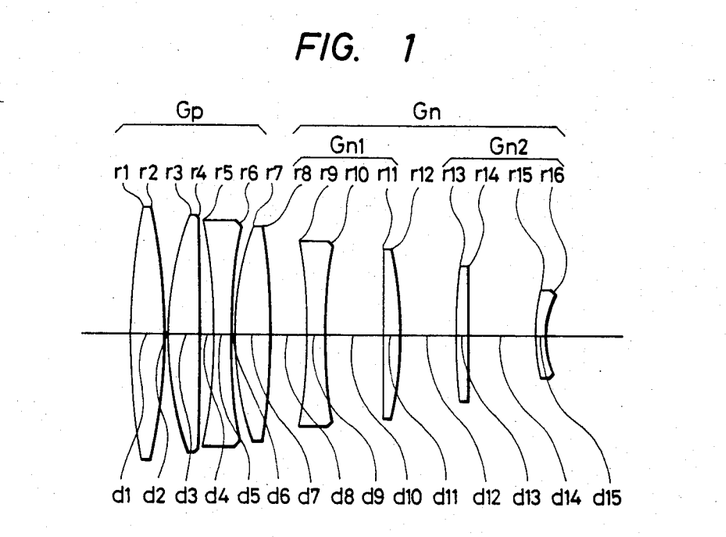
FIGS. 1, 3, 5, 7, 9 and 11 are cross-sectional views of lenses according to Examples 1, 2, 3, 4, 5 and 6, respectively.
Figure 2:
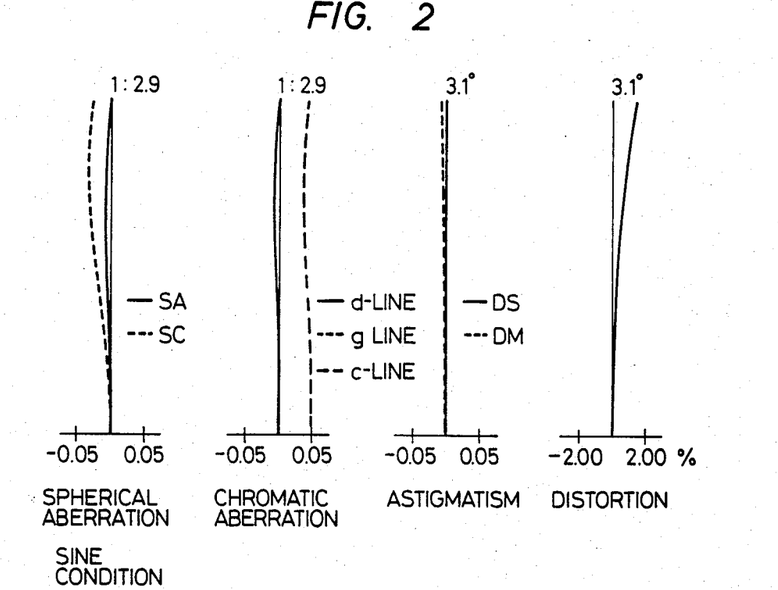
FIGS. 2, 4, 6, 8, 10 and 12 are diagrams showing abberations of the lenses according to the Examples 1, 2, 3, 4, 5, and 6, respectively.
Figure 3:
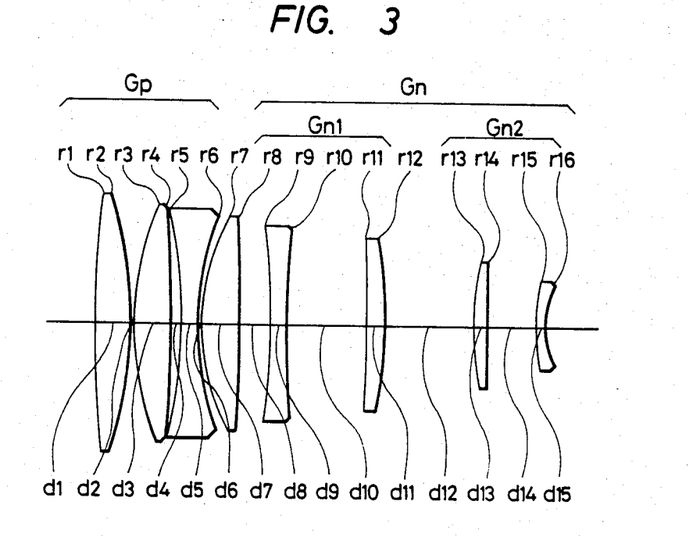
Figure 4:
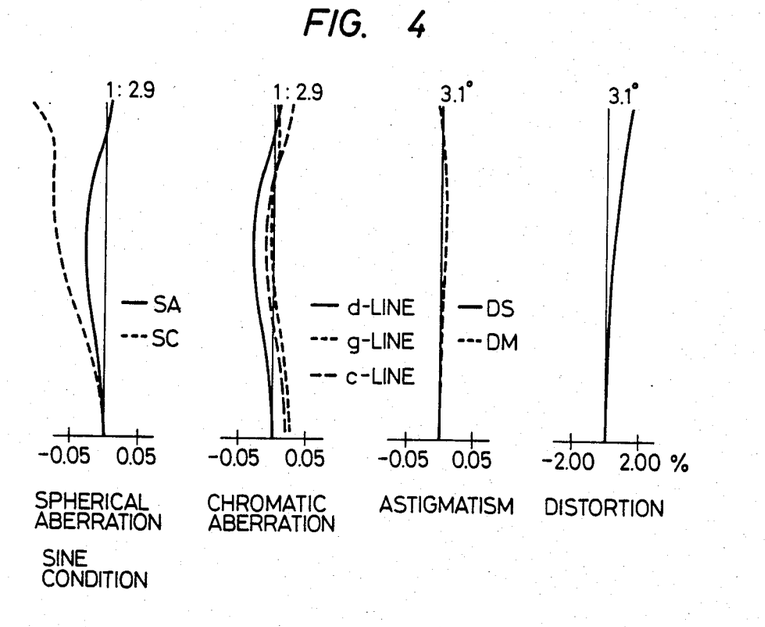
Figure 5:
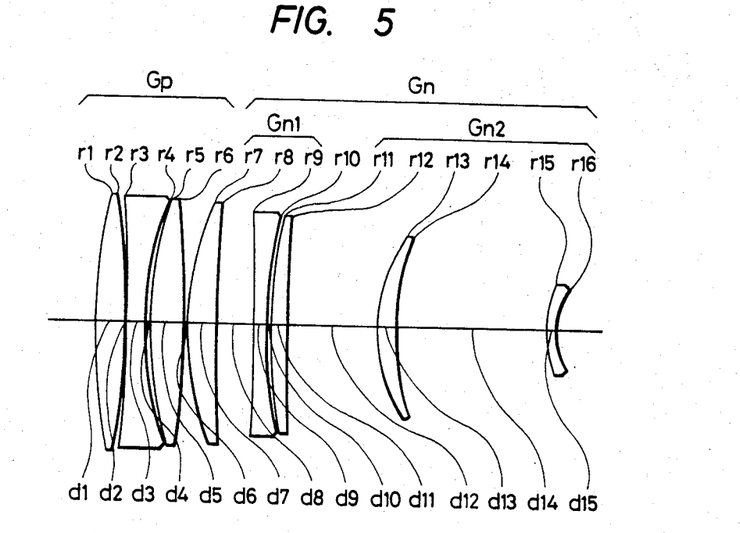
Figure 6:
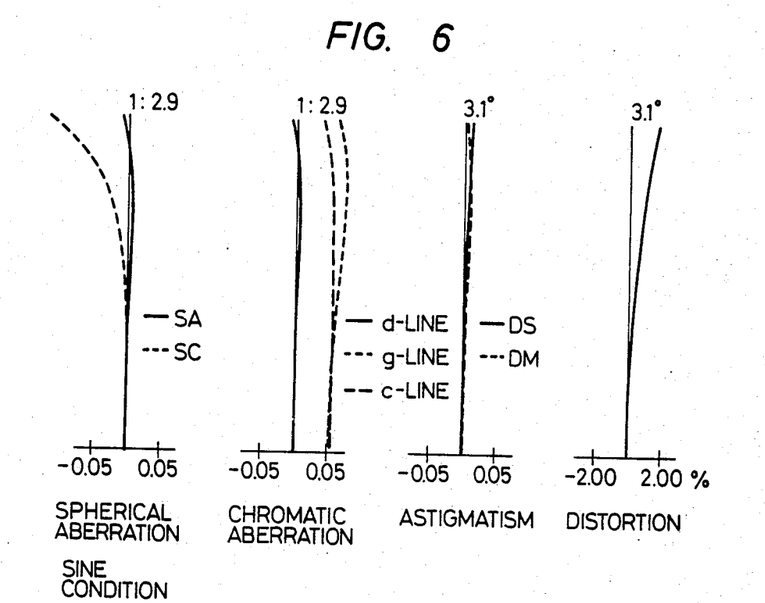
Figure 7:
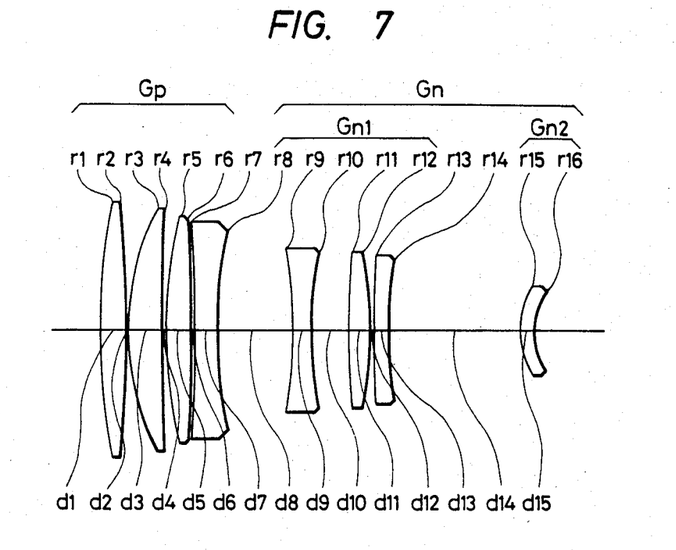
Figure 8:
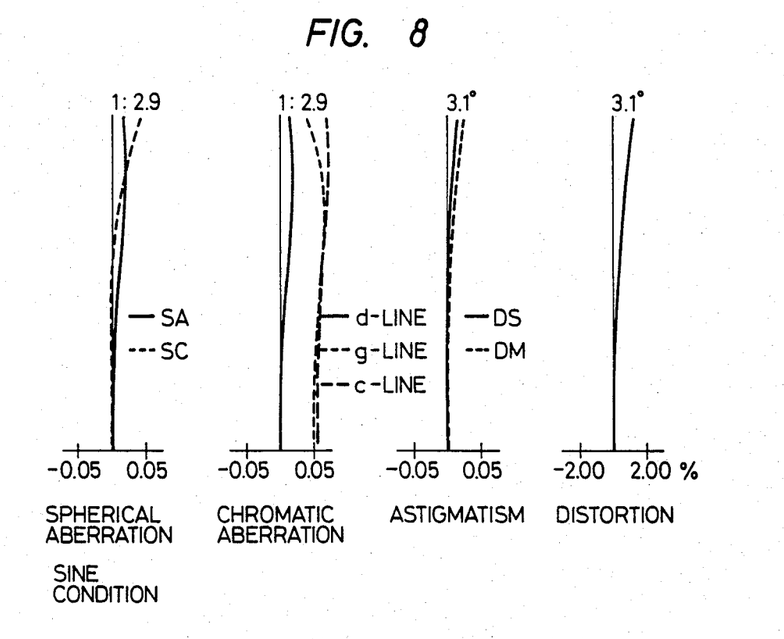
Figure 9:
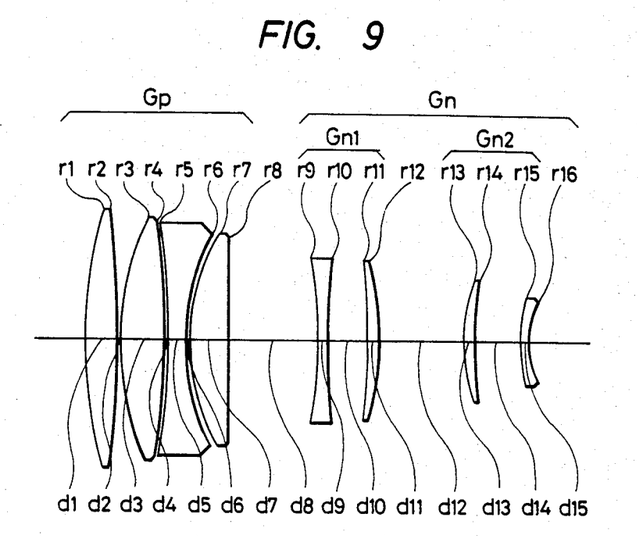
Figure 10:
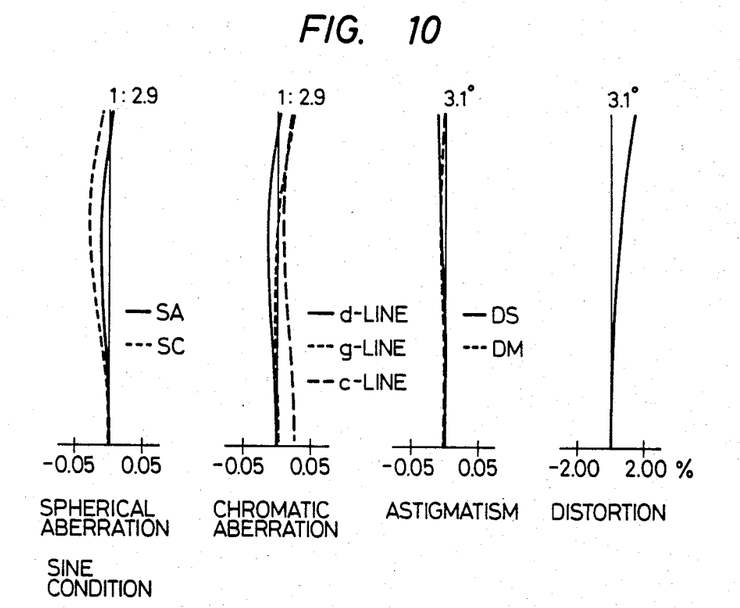
Figure 11:
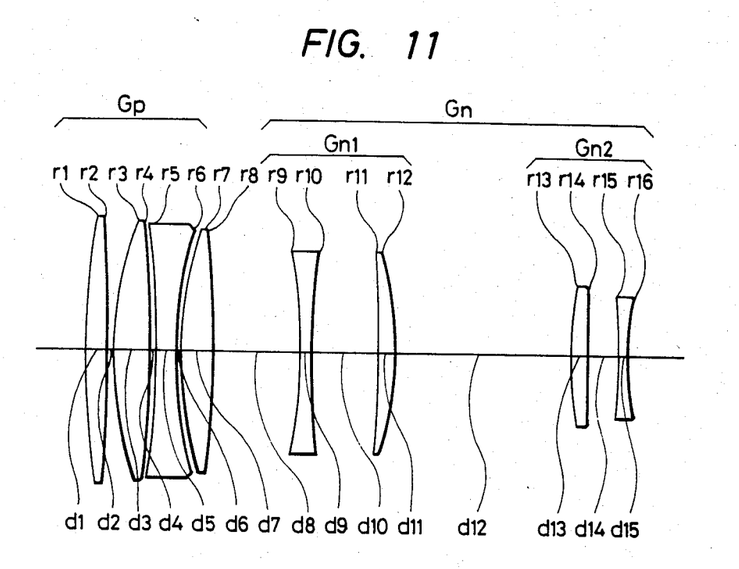
Figure 12:
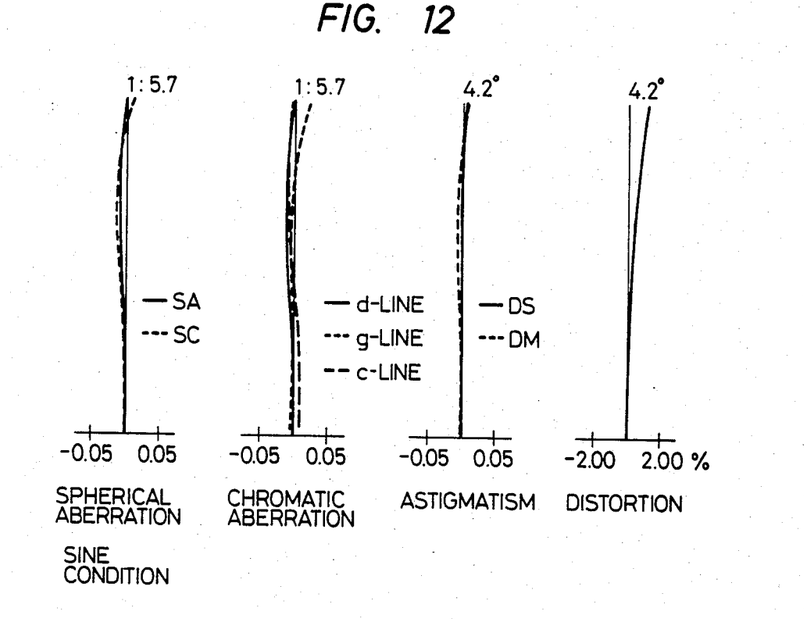

According to the present invention, as shown in the embodiments of FIGS. 1, 3, 5, 7, 9 and 11, a telephoto lens includes a convergent lens group $C_p$ on the object side and a divergent lens group $G_n$ on the image side, the convergent lens group $G_p$ being composed of first, second and third positive lenses and a single negative lens, the first positive lens being closest to the object and made of an optical material having a partial dispersion ratio $$\left(\theta_{g\cdot d} = \frac{n_g - n_d}{n_F - n_C}\right)$$

in the range of from 1.22 to 1.29 with respect to g-line and d-line but not made of an optical material of anomalous dispersion, the negative lens being disposed more closely to the image than the first positive lens, said second and third positive lenses being disposed more closely toward the image than the first positive lens and made of an optical material of anomalous dispersion having a partial dispersion ratio $\theta$ in the range of from 1.22 to 1.24 with respect to g-line and d-line and having an Abbe number $\nu_d$ which ranges from 80 to 95.5, the telephoto lens satisfying the following conditions:

$$0.20 < \frac{\psi_1}{\psi_2 + \psi_3} < 0.55 \quad (1)$$

$$23.5 < \nu_{dn} < 55.0 \quad (2)$$

$$0.4 < \frac{|\psi_n|}{\psi_p} < 0.9 \quad (3)$$

where $\psi_1$, $\psi_2$, $\psi_3$ are the refractive powers of the first, second and third positive lenses, respectively, $\nu_{dn}$ is the Abbe number of the negative lens, $\psi_p$ is the sum of the surface refractive powers of the three positive lenses on their image sides, $\psi_n$ is the surface refractive power of the negative lens on the image side, with $\psi_n < 0$.

The above conditional expressions will now be described. The condition (1) determines the ratio of the refractive power of the first positive lens on the object side to the refractive powers of the second and third positive lenses located more closely than the first positive lens to the image and made of an optical material of anomalous dispersion. If the upper limit of the condition (1) were exceeded, the advantage of the anomalous dispersion could not sufficiently be utilized failing to reduce the secondary spectrum. If the lower limit of the condition (1) were exceeded, the secondary spectrum could be improved effectively. However, if the refractive power of the convergent lens group were increased to gain a desired telephoto ratio, the proportion of the refractive powers of the second and third positive lenses would be excessively large, thereby increasing aberrations of higher degrees such as spherical aberration, coma and the like, so that a bright lens with the aberrations properly compensated for could not be available.

The condition (2) is required for the negative lens in the convergent lens group for reducing the secondary spectrum and preventing the various aberrations from getting worse. If the negative lens exceeded the upper limit of the condition (2), the refractive powers of the lenses in the convergent lens group would be increased in need of meeting an achromatic requirement, with the result that a bright lens with a small telephoto ratio could not be obtained which has aberrations of higher degree compensated for. If the negative lens went beyond the lower limit of the condition (2), it would be possible to correct the aberrations while meeting the achromatic requirement, but the secondary spectrum could not be reduced since the partial dispersion ratio becomes greater as the Abbe number is smaller.

The condition (3) is set for the shape of the lenses in the convergent lens group to provide a bright telephoto lens having a small secondary spectrum and a small telephoto ratio while meeting the foregoing conditions. If the upper limit of the condition (3) were exceeded, the aberrations of higher degree such as spherical aberrations and coma of the negative lens would be increased, and hence a bright lens could not be provided. If the lower limit of the condition (3) were exceeded, correction of the aberrations at the lens surfaces becomes out of balance, or the spherical aberration, coma and astigmatism could not be compensated for in balanced relation.

Futhermore, the telephoto lens so constructed to meet the above conditions according to the present invention includes a divergent lens group $G_n$ composed of a first divergent lens group $G_{n1}$ and a second divergent lens group $G_{n2}$. The first divergent lens group $G_{n1}$ comprises lens surfaces $r_9$–$r_{12}$ in the examples 1, 2, 3, 5 and 6, and comprises lens surface $r_9$ to $r_{14}$ in the example 4. The first divergent lens group $G_{n1}$ is movable on the optical axis toward the image for enabling the lens to focus onto a closer object from a remoter object.

Data items on the examples of the present invention will be given below. Designated in the data items at $r_i$ is the radius of curvature of the ith lens surface, $d_i$ the thickness of the ith lens or the aerial space between adjacent lenses, n the refractive index with respect to d-line, $\nu$ the Abbe number, and $\theta_{g,d}$ the partial dispersion ratios with respect to g-line and d-line.

EXAMPLE 1

Focal length F = 100, F number 1:2.9, Angle of view 2ω = 6.27 degrees

|   | $r_i$ | $d_i$ | n | $\nu$ | $\theta_{g,d}$ |
|---|---|---|---|---|---|
| 1 | 98.111 | 4.897 | 1.48749 | 70.1 | 1.22100 |
| 2 | −78.667 | 0.385 | | | |
| 3 | 47.937 | 4.488 | 1.49700 | 81.6 | 1.23153 |
| 4 | −569.918 | 2.013 | | | |
| 5 | −82.115 | 2.436 | 1.76200 | 40.1 | |
| 6 | 86.052 | 0.511 | | | |
| 7 | 44.901 | 4.998 | 1.49700 | 81.6 | 1.23153 |
| 8 | −109.361 | 5.004 | | | |
| 9 | −86.907 | 2.562 | 1.80610 | 40.9 | |
| 10 | 81.705 | 8.209 | | | |
| 11 | −5912.352 | 2.566 | 1.72151 | 29.2 | |
| 12 | 54.626 | 7.712 | | | |
| 13 | 90.599 | 1.794 | 1.51112 | 60.5 | |
| 14 | −3569.930 | 9.415 | | | |
| 15 | 34.579 | 1.282 | 1.51633 | 64.1 | |
| 16 | 13.108 | | | | |

Overall length (from the first lens plane to the image plane): 89.139

$$\frac{\psi_1}{\psi_2 + \psi_3} = 0.415 \quad \nu_{dn} = 40.1 \quad \frac{|\psi_n|}{\psi_p} = 0.799$$

EXAMPLE 2

Focal length F = 100, F number 1:2.9, Angle of view 2ω = 6.26 degrees

|   | $r_i$ | $d_i$ | n | $\nu$ | $\theta_{g,d}$ |
|---|---|---|---|---|---|
| 1 | 185.319 | 4.926 | 1.48749 | 70.1 | 1.22100 |
| 2 | −56.145 | 0.384 | | | |
| 3 | 41.750 | 5.167 | 1.49700 | 81.6 | 1.23153 |
| 4 | −178.364 | 1.365 | | | |
| 5 | −71.199 | 2.430 | 1.74320 | 49.3 | |
| 6 | 40.589 | 0.458 | | | |
| 7 | 30.174 | 5.344 | 1.49700 | 81.6 | 1.23153 |
| 8 | −299.029 | 4.264 | | | |
| 9 | −108.619 | 2.299 | 1.80610 | 40.9 | |
| 10 | 159.203 | 11.260 | | | |
| 11 | −441.007 | 2.558 | 1.72151 | 29.2 | |
| 12 | −68.092 | 12.358 | | | |
| 13 | 41.764 | 2.078 | 1.51112 | 60.5 | |
| 14 | 646.371 | 6.727 | | | |
| 15 | 35.068 | 1.279 | 1.51633 | 64.1 | |
| 16 | 12.132 | | | | |

Overall length: 92.989

$$\frac{\psi_1}{\psi_2 + \psi_3} = 0.345 \quad \nu_{dn} = 49.3 \quad \frac{|\psi_n|}{\psi_p} = 0.795$$

EXAMPLE 3

Focal length F = 100, F number 1:2.9, Angle of view 2ω = 6.25 degrees.

|   | $r_i$ | $d_i$ | n | $\nu$ | $\theta_{g,d}$ |
|---|---|---|---|---|---|
| 1 | 91.304 | 4.117 | 1.54072 | 47.2 | 1.26463 |
| 2 | −106.482 | 0.246 | | | |
| 3 | −223.623 | 2.435 | 1.78300 | 36.1 | |
| 4 | 49.623 | 0.812 | | | |
| 5 | 59.130 | 4.802 | 1.49700 | 81.6 | 1.23153 |
| 6 | −131.704 | 0.385 | | | |
| 7 | 45.130 | 4.037 | 1.49700 | 81.6 | 1.23153 |
| 8 | 320.435 | 5.127 | | | |
| 9 | −382.985 | 1.946 | 1.80610 | 40.9 | |
| 10 | 77.324 | 0.590 | | | |
| 11 | 86.236 | 2.346 | 1.72151 | 29.2 | |
| 12 | 696.091 | 12.456 | | | |
| 13 | 21.973 | 2.535 | 1.54041 | 51.0 | |
| 14 | 36.600 | 21.140 | | | |
| 15 | 18.449 | 1.282 | 1.58913 | 61.0 | |
| 16 | 10.554 | | | | |

Overall length: 95.222

$$\frac{\psi_1}{\psi_2 + \psi_3} = 0.506 \quad \nu_{dn} = 36.1 \quad \frac{|\psi_n|}{\psi_p} = 0.480$$

EXAMPLE 4

Focal length F = 100, F number 1:2.9, Angle of view 2ω = 6.28 degrees.

|   | $r_i$ | $d_i$ | n | $\nu$ | $\theta_{g,d}$ |
|---|---|---|---|---|---|
| 1 | 98.669 | 3.590 | 1.62004 | 36.3 | 1.28947 |
| 2 | −221.024 | 0.279 | | | |
| 3 | 36.366 | 4.798 | 1.43387 | 95.2 | 1.23246 |
| 4 | 742.199 | 0.478 | | | |
| 5 | 65.203 | 3.569 | 1.49700 | 81.6 | 1.23153 |
| 6 | −296.475 | 0.449 | | | |
| 7 | −248.696 | 3.085 | 1.80518 | 25.4 | |
| 8 | 65.468 | 10.700 | | | |
| 9 | −70.963 | 2.588 | 1.74950 | 35.3 | |
| 10 | 65.907 | 5.163 | | | |
| 11 | 132.934 | 3.097 | 1.80518 | 25.4 | |
| 12 | −55.244 | 0.513 | | | |
| 13 | 306.877 | 2.052 | 1.67270 | 32.1 | |
| 14 | 72.011 | 18.461 | | | |
| 15 | 11.824 | 1.862 | 1.80610 | 40.9 | |
| 16 | 10.145 | | | | |

Overall length: 90.826

$$\frac{\psi_1}{\psi_2 + \psi_3} = 0.439 \quad \nu_{dn} = 25.4 \quad \frac{|\psi_n|}{\psi_p} = 0.831$$

EXAMPLE 5

Focal length F = 100, F number 1:2.9, Angle of view 2ω = 6.21 degrees

| | $r_i$ | $d_i$ | n | ν | $\theta_{g,d}$ |
|---|---|---|---|---|---|
| 1 | 67.602 | 4.952 | 1.48749 | 70.1 | 1.22100 |
| 2 | −140.306 | 0.383 | | | |
| 3 | 40.431 | 6.138 | 1.49700 | 81.6 | 1.23153 |
| 4 | −103.959 | 0.554 | | | |
| 5 | −96.691 | 2.423 | 1.74320 | 49.3 | |
| 6 | 31.576 | 0.510 | | | |
| 7 | 29.917 | 5.462 | 1.49700 | 81.6 | 1.23153 |
| 8 | −1171.904 | 12.459 | | | |
| 9 | −60.204 | 1.469 | 1.80610 | 40.9 | |
| 10 | 136.017 | 5.446 | | | |
| 11 | −120.408 | 1.760 | 1.72151 | 29.2 | |
| 12 | −39.924 | 11.883 | | | |
| 13 | 25.068 | 1.656 | 1.69350 | 53.2 | |
| 14 | 75.232 | 6.319 | | | |
| 15 | 29.476 | 1.148 | 1.65844 | 50.9 | |
| 16 | 12.495 | | | | |

Overall length: 92.506

$$\frac{\psi_1}{\psi_2 + \psi_3} = 0.313 \quad \nu_{dn} = 49.3 \quad \frac{|\psi_n|}{\psi_p} = 0.886$$

EXAMPLE 6

Focal length F = 100, F number 1:5.71, Angle of view 2ω = 8.46 degrees

| | $r_i$ | $d_i$ | n | ν | $\theta_{g,d}$ |
|---|---|---|---|---|---|
| 1 | 66.521 | 1.553 | 1.48749 | 70.1 | 1.22100 |
| 2 | −128.015 | 0.383 | | | |
| 3 | 26.444 | 2.561 | 1.49700 | 81.6 | 1.23153 |
| 4 | −73.748 | 0.414 | | | |
| 5 | −59.018 | 1.363 | 1.74320 | 49.3 | |
| 6 | 30.898 | 0.334 | | | |
| 7 | 27.564 | 2.310 | 1.49700 | 81.6 | 1.23153 |
| 8 | −70.358 | 6.045 | | | |
| 9 | −35.301 | 0.839 | 1.76200 | 40.1 | |
| 10 | 63.568 | 4.628 | | | |
| 11 | −106.265 | 1.234 | 1.72151 | 29.2 | |
| 12 | −24.410 | 12.258 | | | |
| 13 | 28.885 | 1.180 | 1.69350 | 53.2 | |
| 14 | 165.409 | 2.205 | | | |
| 15 | −59.655 | 0.676 | 1.56883 | 56.3 | |
| 16 | 17.731 | | | | |

Overall length: 79.353

$$\frac{\psi_1}{\psi_2 + \psi_3} = 0.221 \quad \nu_{dn} = 49.3 \quad \frac{|\psi_n|}{\psi_p} = 0.715$$

With the arrangement of the present invention, there is provided a bright telephoto lens having a small telephoto ratio and quite a small secondary spectrum with various aberrations such as spherical aberration and coma being corrected ro compensated for property, without using a special optical material of anomalous dispersion for the lens located most closely to the object. The telephoto lens of the invention is advantageous over telephoto lenses including a lens closest to the object which is made of an optical material in that the lens is less liable to get damaged and less subjected to poor performance due to temperature changes.

What is claimed is:

1. A telephoto lens having a convergent lens group on the object side and a divergent lens group on the image side, wherein said convergent lens group is composed in combination of first, second and third positive lenses and a single negative lens, said first positive lens being closest to the object and made of an optical material having a partial dispersion ratio in the range of from 1.22 to 1.29 with respect to g-line and d-line but made of optical material of other than anomalous dispersion, said negative lens being disposed more closely to the image than said first positive lens, said second and third positive lenses being disposed more closely toward the image than said first positive lens and made of an optical material of anomalous dispersion having a partial dispersion ratio $\theta$ in the range of from 1.22 to 1.24 with respect to g-line and d-line and having an Abbe number $\nu_d$ which ranges from 80 to 95.5, said telephoto lens satisfying the following relations:

$$0.20 < \frac{\psi_1}{\psi_2 + \psi_3} < 0.55 \quad (1)$$

$$23.5 < \nu_{dn} < 55.0 \quad (2)$$

$$0.4 < \frac{|\psi_n|}{\psi_p} < 0.9 \quad (3)$$

where $\psi_1$, $\psi_2$, $\psi_3$ are the refractive powers of the first, second and third positive lenses, respectively, $\nu_{dn}$ is the Abbe number of the negative lens, $\psi_p$ is the sum of the surface refractive powers of the three positive lenses on their image sides, and $\psi_n$ is the surface refractive power of the negative lens on the image side, with $\psi_n < 0$.

2. The telephoto lens according to claim 1, wherein said divergent lens group is composed of first and second divergent lens groups in order from the object, said first divergent lens group being movable on an optical axis toward the image for focusing on an object at a closer distance.

3. The telephoto lens according to claim 2, further satisfying the following chart:

Focal length F = 100, F number 1:2.9, Angle of view 2ω = 6.27 degrees

| | $r_i$ | $d_i$ | n | ν | $\theta_{g,d}$ |
|---|---|---|---|---|---|
| 1 | 98.111 | 4.897 | 1.48749 | 70.1 | 1.22100 |
| 2 | −78.667 | 0.385 | | | |
| 3 | 47.937 | 4.488 | 1.49700 | 81.6 | 1.23153 |
| 4 | −569.918 | 2.013 | | | |
| 5 | −82.115 | 2.436 | 1.76200 | 40.1 | |
| 6 | 86.052 | 0.511 | | | |
| 7 | 44.901 | 4.998 | 1.49700 | 81.6 | 1.23153 |
| 8 | −109.361 | 5.004 | | | |
| 9 | −86.907 | 2.562 | 1.80610 | 40.9 | |
| 10 | 81.705 | 8.209 | | | |
| 11 | −5912.352 | 2.566 | 1.72151 | 29.2 | |
| 12 | 54.626 | 7.712 | | | |
| 13 | 90.599 | 1.794 | 1.51112 | 60.5 | |
| 14 | −3569.930 | 9.415 | | | |
| 15 | 34.579 | 1.282 | 1.51633 | 64.1 | |
| 16 | 13.108 | | | | |

Overall length (from the first lens plane to the image plane): 89.139

$$\frac{\psi_1}{\psi_2 + \psi_3} = 0.415 \quad \nu_{dn} = 40.1 \quad \frac{|\psi_n|}{\psi_p} = 0.799$$

where
- $r_i$ is the radius of curvature of the ith lens surface,
- $d_i$ is the thickness of the ith or the aerial space between the adjacent lenses,
- n is the refractive index with respect to d-line,
- ν is the Abbe number, and
- $\theta_{g,d}$ is the partial dispersion with respect to g-line and d-line.

4. The telephoto lens according to claim 2, further satisfying the following chart:

Focal length F = 100, F number 1:2.9, Angle of view 2ω = 6.26 degrees

|   | $r_i$ | $d_i$ | n | ν | $\theta_{g,d}$ |
|---|---|---|---|---|---|
| 1 | 185.319 | 4.926 | 1.48749 | 70.1 | 1.22100 |
| 2 | −56.145 | 0.384 | | | |
| 3 | 41.750 | 5.167 | 1.49700 | 81.6 | 1.23153 |
| 4 | −178.364 | 1.365 | | | |
| 5 | −71.199 | 2.430 | 1.74320 | 49.3 | |
| 6 | 40.589 | 0.458 | | | |
| 7 | 30.174 | 5.344 | 1.49700 | 81.6 | 1.23153 |
| 8 | −299.029 | 4.264 | | | |
| 9 | −108.619 | 2.299 | 1.80610 | 40.9 | |
| 10 | 159.203 | 11.260 | | | |
| 11 | −441.007 | 2.558 | 1.72151 | 29.2 | |
| 12 | −68.092 | 12.358 | | | |
| 13 | 41.764 | 2.078 | 1.51112 | 60.5 | |
| 14 | 646.371 | 6.727 | | | |
| 15 | 35.068 | 1.279 | 1.51633 | 64.1 | |
| 16 | 12.132 | | | | |

Overall length: 92.989

$$\frac{\psi_1}{\psi_2 + \psi_3} = 0.345 \quad \nu_{dn} = 49.3 \quad \frac{|\psi_n|}{\psi_p} = 0.795$$

where $r_i$ is the radius of curvature of the ith lens surface,
$d_i$ is the thickness of the ith lens or the aerial space between the adjacent lenses,
n is the refractive index with respect to d-line,
ν is the Abbe number, and
$\theta_{g,d}$ is the partial dispersion with respect to g-line and d-line.

5. The telephoto lens according to claim 2, further satisfying the following chart:

Focal length F = 100, F number 1:2.9, Angle of view 2ω = 6.25 degrees.

|   | $r_i$ | $d_i$ | n | ν | $\theta_{g,d}$ |
|---|---|---|---|---|---|
| 1 | 91.304 | 4.117 | 1.54072 | 47.2 | 1.26463 |
| 2 | −106.482 | 0.246 | | | |
| 3 | −223.623 | 2.435 | 1.78300 | 36.1 | |
| 4 | 49.623 | 0.812 | | | |
| 5 | 59.130 | 4.802 | 1.49700 | 81.6 | 1.23153 |
| 6 | −131.704 | 0.385 | | | |
| 7 | 45.130 | 4.037 | 1.49700 | 81.6 | 1.23153 |
| 8 | 320.435 | 5.127 | | | |
| 9 | −382.985 | 1.946 | 1.80610 | 40.9 | |
| 10 | 77.324 | 0.590 | | | |
| 11 | 86.236 | 2.346 | 1.72151 | 29.2 | |
| 12 | 696.091 | 12.456 | | | |
| 13 | 21.973 | 2.535 | 1.54041 | 51.0 | |
| 14 | 36.600 | 21.140 | | | |
| 15 | 18.449 | 1.282 | 1.58913 | 61.0 | |
| 16 | 10.554 | | | | |

Overall length: 95.222

$$\frac{\psi_1}{\psi_2 + \psi_3} = 0.506 \quad \nu_{dn} = 36.1 \quad \frac{|\psi_n|}{\psi_p} = 0.480$$

where $r_i$ is the radius of curvature of the ith lens surface,
$d_i$ is the thickness of the ith lens or the aerial space between the adjacent lenses,
n is the refractive index with respect to d-line,
ν is the Abbe number, and
$\theta_{g,d}$ is the partial dispersion with respect to g-line and d-line.

6. The telephoto lens according to claim 2, further satisfying the following chart:

Focal length F = 100, F number 1:2.9, Angle of view 2ω = 6.28 degrees.

|   | $r_i$ | $d_i$ | n | ν | $\theta_{g,d}$ |
|---|---|---|---|---|---|
| 1 | 98.669 | 3.590 | 1.62004 | 36.3 | 1.28947 |
| 2 | −221.024 | 0.279 | | | |
| 3 | 36.366 | 4.798 | 1.43387 | 95.2 | 1.23246 |
| 4 | 742.199 | 0.478 | | | |
| 5 | 65.203 | 3.569 | 1.49700 | 81.6 | 1.23153 |
| 6 | −296.475 | 0.449 | | | |
| 7 | −248.696 | 3.085 | 1.80518 | 25.4 | |
| 8 | 65.468 | 10.700 | | | |
| 9 | −70.963 | 2.588 | 1.74950 | 35.3 | |
| 10 | 65.907 | 5.163 | | | |
| 11 | 132.934 | 3.097 | 1.80518 | 25.4 | |
| 12 | −55.244 | 0.513 | | | |
| 13 | 306.877 | 2.052 | 1.67270 | 32.1 | |
| 14 | 72.011 | 18.461 | | | |
| 15 | 11.824 | 1.862 | 1.80610 | 40.9 | |
| 16 | 10.145 | | | | |

Overall length: 90.826

$$\frac{\psi_1}{\psi_2 + \psi_3} = 0.439 \quad \nu_{dn} = 25.4 \quad \frac{|\psi_n|}{\psi_p} = 0.831$$

where $r_i$ is the radius of curvature of the ith lens surface,
$d_i$ is the thickness of the ith lens or the aerial space between the adjacent lenses,
n is the refractive index with respect to d-line,
ν is the Abbe number, and
$\theta_{g,d}$ is the partial dispersion with respect to g-line and d-line.

7. The telephoto lens according to claim 2, further satisfying the following chart:

Focal length F = 100, F number 1:2.9, Angle of view 2ω = 6.21 degrees

|   | $r_i$ | $d_i$ | n | ν | $\theta_{g,d}$ |
|---|---|---|---|---|---|
| 1 | 67.602 | 4.952 | 1.48749 | 70.1 | 1.22100 |
| 2 | −140.306 | 0.383 | | | |
| 3 | 40.431 | 6.138 | 1.49700 | 81.6 | 1.23153 |
| 4 | −103.959 | 0.554 | | | |
| 5 | −96.691 | 2.423 | 1.74320 | 49.3 | |
| 6 | 31.576 | 0.510 | | | |
| 7 | 29.917 | 5.462 | 1.49700 | 81.6 | 1.23153 |
| 8 | −1171.904 | 12.459 | | | |
| 9 | −60.204 | 1.469 | 1.80610 | 40.9 | |
| 10 | 136.017 | 5.446 | | | |
| 11 | −120.408 | 1.760 | 1.72151 | 29.2 | |
| 12 | −39.924 | 11.883 | | | |
| 13 | 25.068 | 1.656 | 1.69350 | 53.2 | |
| 14 | 75.232 | 6.319 | | | |
| 15 | 29.476 | 1.148 | 1.65844 | 50.9 | |
| 16 | 12.495 | | | | |

Overall length: 92.506

$$\frac{\psi_1}{\psi_2 + \psi_3} = 0.313 \quad \nu_{dn} = 49.3 \quad \frac{|\psi_n|}{\psi_p} = 0.886$$

where $r_i$ is the radius of curvature of the ith lens surface,
$d_i$ is the thickness of the ith lens or the aerial space between the adjacent lenses,
n is the refractive index with respect to d-line,
ν is the Abbe number, and
$\theta_{g,d}$ is the partial dispersion with respect to g-line and d-line.

8. The telephoto lens according to claim 2, further satisfying the following chart:

| | Focal length F = 100, F number 1:5.71, Angle of view 2ω = 8.46 degrees | | | | |
|---|---|---|---|---|---|
| | $r_i$ | $d_i$ | n | $\nu$ | $\theta_{g,d}$ |
| 1 | 66.521 | 1.553 | 1.48749 | 70.1 | 1.22100 |
| 2 | −128.015 | 0.383 | | | |
| 3 | 26.444 | 2.561 | 1.49700 | 81.6 | 1.23153 |
| 4 | −73.748 | 0.414 | | | |
| 5 | −59.018 | 1.363 | 1.74320 | 49.3 | |
| 6 | 30.898 | 0.334 | | | |
| 7 | 27.564 | 2.310 | 1.49700 | 81.6 | 1.23153 |
| 8 | −70.358 | 6.045 | | | |
| 9 | −35.301 | 0.839 | 1.76200 | 40.1 | |
| 10 | 63.568 | 4.628 | | | |
| 11 | −106.265 | 1.234 | 1.72151 | 29.2 | |
| 12 | −24.410 | 12.258 | | | |
| 13 | 28.885 | 1.180 | 1.69350 | 53.2 | |
| 14 | 165.409 | 2.205 | | | |
| 15 | −59.655 | 0.676 | 1.56883 | 56.3 | |
| 16 | 17.731 | | | | |

Overall length: 79.353

$$\frac{\psi_1}{\psi_2 + \psi_3} = 0.221 \quad \nu_{dn} = 49.3 \quad \frac{|\psi_n|}{\psi_p} = 0.715$$

where
$r_i$ is the radius of curvature of the ith lens surface,
$d_i$ is the thickness of the ith lens or the aerial space between the adjacent lenses.
n is the refractive index with respect to d-line,
$\nu$ is the Abbe number, and
$\theta_{g,d}$ is the partial dispersion with respect to g-line and d-line.

* * * * *